United States Patent [19]

Zimmerman

[11] Patent Number: 4,876,798

[45] Date of Patent: Oct. 31, 1989

[54] LEVEL WITH ILLUMINATED BUBBLE VIALS

[76] Inventor: Harold Zimmerman, 2606 Mercury La., Bismarck, N. Dak. 58501

[21] Appl. No.: 142,649

[22] Filed: Jan. 11, 1988

[51] Int. Cl.$^4$ .............................................. G01C 9/32
[52] U.S. Cl. ..................................... 33/348.2; 33/379
[58] Field of Search ....................... 33/348, 348.2, 379, 33/381, 382, 390

[56] References Cited

U.S. PATENT DOCUMENTS

| | | |
|---|---|---|
| D 224,663 | 8/1972 | DeJong . |
| 1,566,541 | 12/1925 | Kirby . |
| 2,198,945 | 4/1940 | Morris . |
| 2,543,572 | 2/1951 | Friberg . |
| 2,607,882 | 8/1952 | Arnold . |
| 2,615,122 | 10/1952 | Coombs . |
| 2,652,481 | 9/1953 | Hall . |
| 2,806,133 | 9/1957 | Aube . |
| 2,944,144 | 7/1960 | Naylor ............................. 33/348.2 |
| 3,213,545 | 10/1965 | Wright . |
| 3,311,990 | 4/1967 | Wright . |
| 3,738,015 | 6/1973 | DeJong ................................. 33/379 |
| 4,407,075 | 10/1983 | MacDermott ..................... 33/348.2 |
| 4,463,501 | 8/1984 | Wright et al. . |

Primary Examiner—Harry N. Haroian
Attorney, Agent, or Firm—Kinney & Lange

[57] ABSTRACT

An illuminated level includes a main frame providing parallel spaced-apart flat plane working surfaces connected together by a flat main frame web. The web is provided with three main frame sight ports extending therethrough. A bubble vial is positioned across each of the main frame sight ports. First and second side plates are positioned, one on either side of the web. Mounted on one of these side plates in adjacent relation to the web are six light emitting diodes, each positioned in adjacent relationship to an end portion of one of the three bubbles vials. A switch and a battery are also mounted to this side plate as are appropriate electrical conductors. The electrical conductors couple the light emitting diodes, the battery and the switch to cause energization of the light emitting diodes when the switch is actuated.

4 Claims, 3 Drawing Sheets

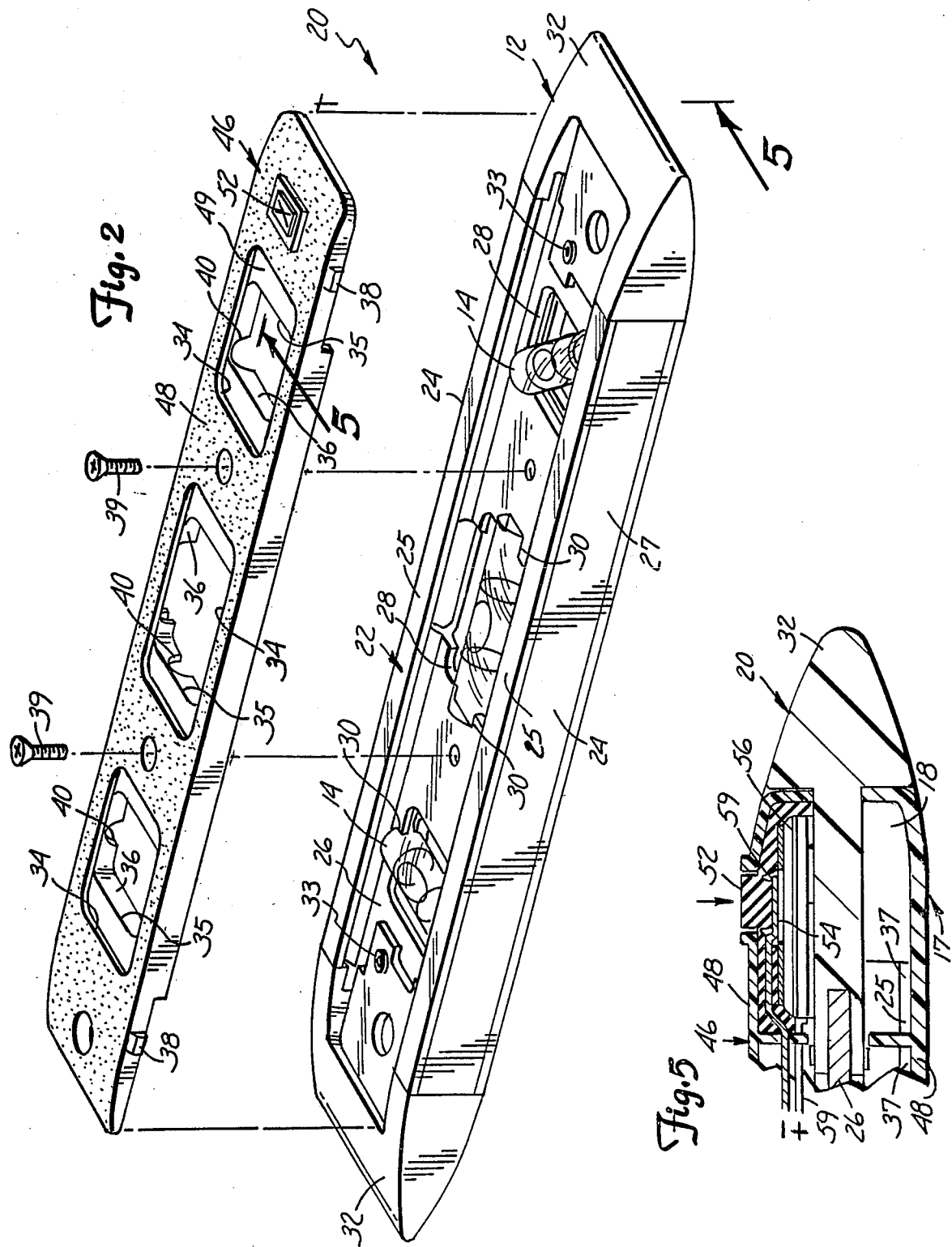

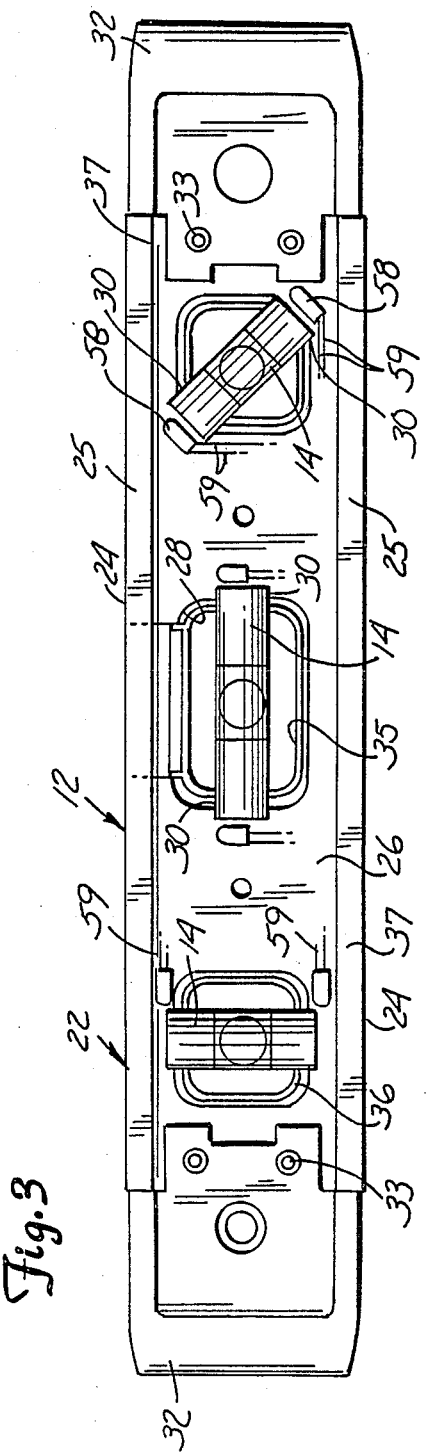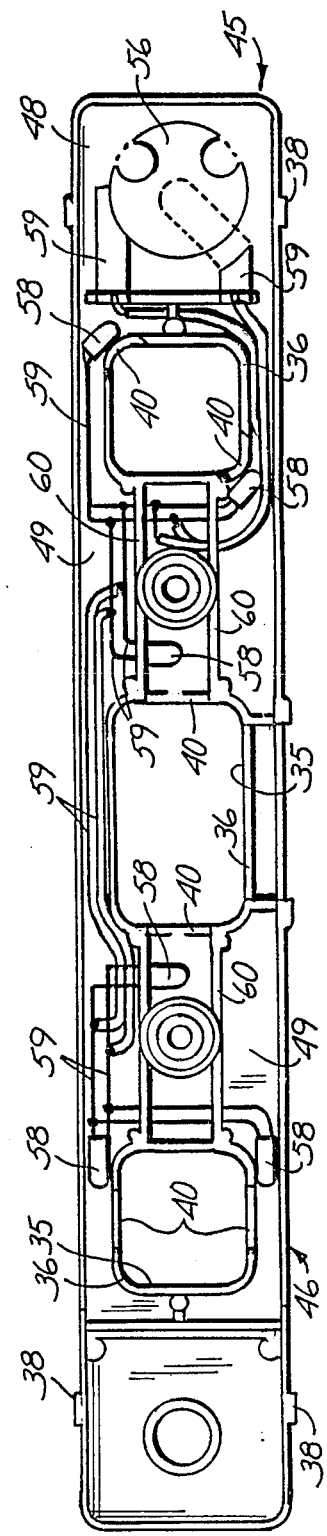

LEVEL WITH ILLUMINATED BUBBLE VIALS

BACKGROUND OF THE INVENTION

1. Field of the Invention.

This invention has relation to the illumination of levels in which an elongate main frame is provided with a flat plane working surface and a plurality of sight ports. A plurality of bubble vials are fixedly mounted in the frame across the sight ports to have permanently fixed angular relationship with respect to the working surface. The invention also has relation to providing means to illuminate the position of the bubbles within the vials in the form of a kit to retrofit existing levels.

2. Description of the Prior Art.

It has long been recognized as advantageous to provide illumination of bubble vials of levels. For instance, as an electrician, the present inventor must level, plumb and install many electrical conduits and other elements in new buildings before permanent lighting is available in such buildings. The need for illuminated bubble vials in levels has been recognized in the following U.S. Pats. Nos.: 1,566,541 for ELECTRIC LIGHT ATTACHMENT FOR LEVELS granted to Kirby in December of 1925; 2,198,945 for ILLUMINATED LEVEL granted to Morriss in April of 1940; 2,543,572 for ILLUMINATED SPIRIT LEVEL HAVING A RECESSED BATTERY-RECEIVING WEB granted to Friberg in February of 1951; 2,607,882 for ILLUMINATED LEVEL granted to Arnold in August of 1952; 2,615,122 for ILLUMINATED LEVEL granted to Coombs in October of 1952; 2,652,481 for ILLUMINATED LEVEL granted to Hall in September of 1953; and 2,806,133 for ILLUMINATED SPIRIT LEVEL granted to Aube in September of 1957.

While none of the structures shown in these patents has been known to find wide acceptance in the marketplace, and while none are readily available on the market today, they all suffer from difficulties which render them more or less unsuitable for their intended purpose. For example, most appear to be several feet long, and while this length may actually be an advantage for many uses, it is unsatisfactory for use by construction workers such as plumbers and electricians who must align building components in confined quarters.

All of the patents cited above rely on electric light bulbs, the filaments of which break the first or second time they are dropped to the floor. Such levels are not rugged enough for general day-in and day-out usage by construction workers or others.

All of the patents cited above show structures which rely on light sources which illuminate the general area of sight ports containing lighted vials. Such patents do not disclose means to provide a light source which directs the light into end portions of each bubble vial to cause the light to travel through the liquid within the vial to impinge on the surface of the bubble to make it a reflective surface, and as such, to more sharply define the position of the bubble in the vial.

One such patent, the patent to Arnold, discloses a retrofit arrangement whereby "an elongated substantially rectangular support plate 34" (also called "a combined reflector and support plate") holds flashlight members and completely blocks off each of the sight ports from one side. This shields the vials from ambient light and even in the day time would require artificial illumination either from the level itself or from light coming from behind the user.

What was needed before the present invention was a rugged, droppable level in which light sources are situated at the opposite ends of bubble vials to illuminate the liquid within the vials so that the boundary walls between the bubbles and the liquid are sharply defined; the overall level being of dimension to fit easily within the pocket or tool pouch on the body of the user between uses.

Also needed was a retrofit structure which could be applied to an existing level to meet the needs set out above. An excellent level to modify with such a retrofit structure to meet at least all of these needs is a level about nine inches long, sold by Sears under the trademark CRAFTSMAN, Model No. 939829. Such a level is sold marked PAT. NO. 4,463,501. That patent was granted to Wright et al. in August of 1984.

Neither the inventor nor those in privity with him are aware of any prior art which is closer than that discussed above, and are aware of no prior art which anticipates the claims made herein.

SUMMARY OF THE INVENTION

An illuminated level can include an elongate main frame provided with at least one longitudinally extending flat plane working surface and a web extending generally in parallel relation to the longitudinal axis of the working surface and at right angles to the plane of that working surface, the web being provided with at least one main frame sight port therethrough. A bubble vial is fixedly positioned in the main frame across the main frame sight port to have a permanently fixed angular relationship with respect to the plane of the main frame working surface. A pair of opaque side plates can be positioned to cover at least a substantial portion of the frame web, one on each side of the main frame, and each of these side plates will be provided with a side plate sight port in visual alignment with the main frame sight port.

To constitute such a level as an illuminated level, light emitting diode means is mounted between the side plates in adjacent relation to the main frame web in position to emit light on end portions of the bubble vial, a switch is mounted in fixed relation to one of the side plates in position for actuation by an operator, battery means is mounted between the side plates, and electrical conductors are situated between the side plates. Such conductors couple the light emitting diode means, the battery means and the switch to cause energization of the light-emitting diode means when the switch is actuated.

An unlighted level can be retrofitted to become an illuminated level by constituting one of the opaque side plates as a retrofit assembly including a retrofit side plate having an outer opaque side panel with a panel sight port therethrough adapted to be aligned with the main frame sight port and having an inner light reflective shield provided with a shield sight port visually aligned with the main frame sight port and the retrofit panel sight port. The retrofit light reflective shield is provided with an outer shell to be positioned in adjacent relation to an inner surface of the opaque side panel and in spaced, generally parallel relation to the main frame web. The switch is mounted to the retrofit outer opaque side panel as is the battery means. The electrical conductors and light emitting diodes are mounted to the inner retrofit light reflective shield between the outer shell of the shield and the main frame web, with electrical connections extending to the battery means and the switch.

BRIEF DESCRIPTION OF THE DRAWINGS

FIG. 2 is an exploded perspective view of the level of FIG. 1 with its first side plate removed and with a retrofit assembly of the invention in position to be installed;

FIG. 3 is a bottom plan view of the retrofit assembly of FIG. 2;

FIG. 4 is an enlarged schematic view of the illuminated level of the invention with parts in section and parts broken away to show the relative positioning of its main frame, bubble vials, and light emitting devices with respect to each other after the retrofit assembly of the invention has been installed; and FIG. 5 is an enlarged, fragmentary, vertical sectional view taken as on the line 5—5 in FIG. 2.

DETAILED DESCRIPTION OF THE PREFERRED EMBODIMENT

Figure 1:
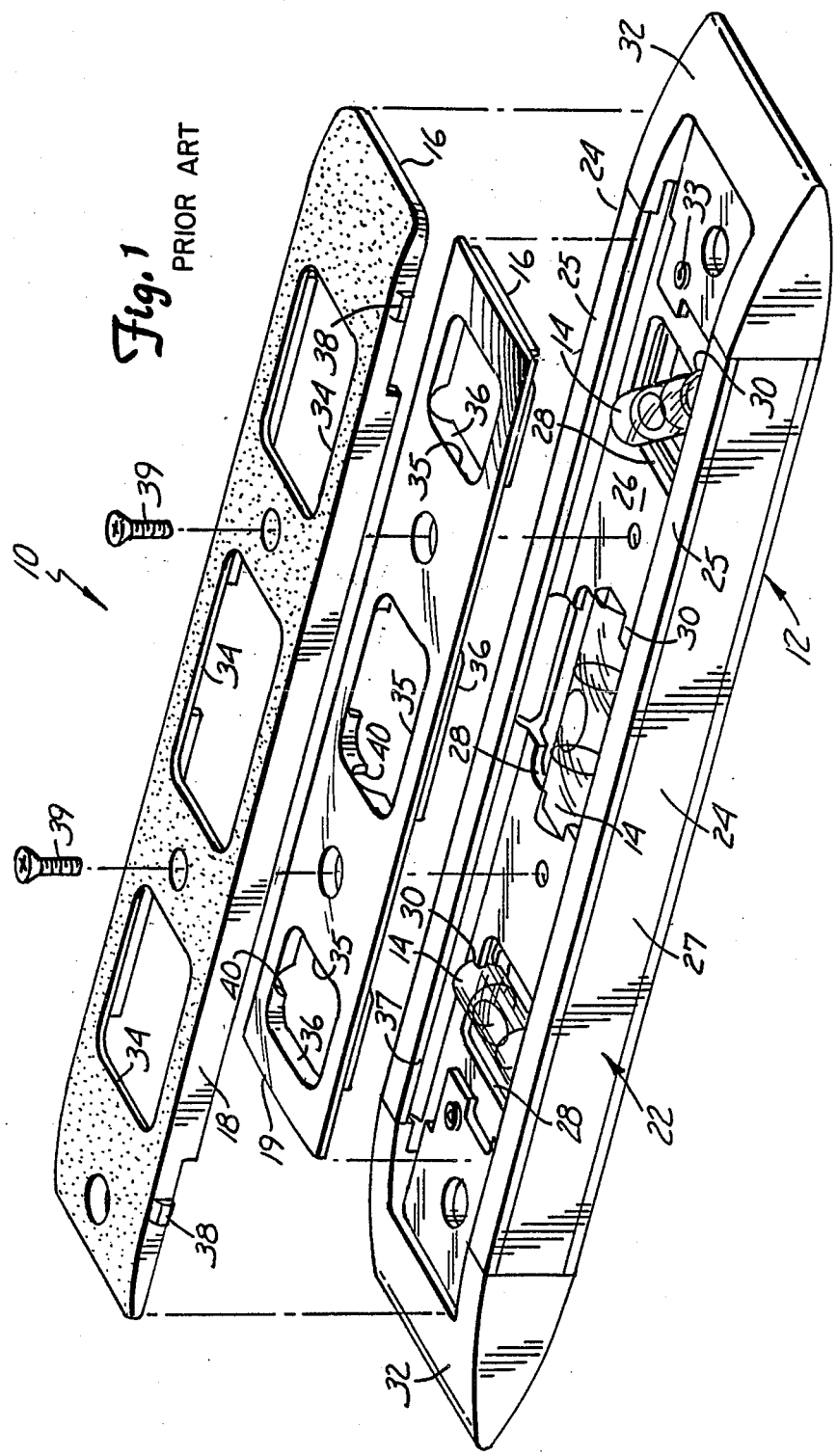
FIG. 1 is an exploded perspective view of a prior art level into which a retrofit assembly of the present invention is to be installed.

To understand the retrofitted level, a prior art level which is to be retrofitted will first be described.

The prior art unlighted level 10 includes a main frame 12, a plurality of bubble vials 14, a first side plate 16, and a second substantially identical or mirror image side plate 17.

The first and second side plates each include an opaque side panel 18 and a light reflective shield 19.

The main frame 12 of the unlighted level 10 is identical with the main frame of a retrofitted illuminated level 20. In each, the main frame includes a generally I-shape frame member 22. Frame member 22 is partially defined by mutually parallel, spaced apart, longitudinally extending, flat, plane working surfaces 24,24 which define the outer surfaces of two outer bars 25,25 making up the extremeties of that I-shape frame member. As clearly shown in FIGS. 1 and 2, one of the outer bars 25 of the main frame 12 includes a rectangular magnetic strip 27 which is inset so that its outer surface is constituted as a major portion of the working surface 24 of that outer bar 25.

The two outer bars 25,25 are separated by a web 26 which is also part of the frame member and which extends between the bars parallel to the longitudinal axes of the working surfaces 24,24 and at right angles to the planes of those working surfaces. Web 26 is provided with three main frame sight ports 28 extending therethrough.

In the web 26 and on the outer edges of each of these ports 28 are provided a pair of mutually aligned vial confining slots 30,30, a first such pair of slots at a first frame right port positioned to confine a first vial to extend across the port to have its longitudinal axis at right angles to the working surfaces 24, a second pair at a second frame sight port positioned to confine a second vial to have its longitudinal axis of in parallel relationship to these working surfaces, and a third pair positioned to confine the third vial to have its axis at a position at 45° with respect to the working surfaces and the longitudinal axis of the working surfaces.

In the form of the invention as shown, the main frame 12 includes a pair of end plates 32,32 which are riveted as at 33 to the web 26.

Each bubble vial 14, in the form of the invention as shown, is roughly a closed cylindrical vessel partially filled with a liquid which is often tinted (sometimes greenish yellow), but is sometimes clear. Each vial also includes a bubble of air or other gas. When the longitudinal axis of each cylindrical vial is properly aligned as in use of the level for its intended purpose, this gas bubble will appear in the exact center of the vial. It is to observe the alignment of these bubbles in these vials that it is sometimes necessary and often advantageous to provide illumination to the vials.

Each of the opaque side panels 18 is provided with three side panel sight ports 34 each adapted to be visually aligned with one of the three main frame sight ports 28. Each of the light reflective shields 19 is adapted to fit snugly within one of the opaque side panels 18 together to form either a first side plate 16 or a second side plate 17. Each light reflective shield 19 is provided with three shield sight ports 35, each adapted to be visually aligned with one of the main frame sight ports 28 and one of the side panel sight ports 34. In the form of the invention as shown, these shield sight ports 35 terminate inwardly from the side panel sight ports 34, and a skirt 36 is provided around each of the sight ports 35 to extend away from the outer surface of its shield 19 toward the web 26 of the main frame 12. The configuration of the skirts is such that when they are assembled to the main frame, the skirt of each light reflective shield 19 extends into one of the main frame sight ports 28 and touches the skirt of another reflective shield 19.

Each of the outer bars 25,25 of the I-shape frame member 22 is provided with a pair of mutually parallel flanges 37,37 extending at right angles away from its working surface 24. Each of the two opaque side panels 18 are provided with four fastening bosses 38 extending outwardly from opposite end portions of their opposite side edges. Two fastening screw holes are provided in each of the side panels 18. Screw passage holes are also provided in the web 26 and the light reflective shields 19. Only the screw holes in the second side plate 17 are tapped to receive fastening screws 39,39.

The skirts 36 around each of the shield sight ports 35 are provided with pairs of saddles 40,40 in alignment with the main frame vial confining slots 30,30. The positioning and configuration of these saddles 40,40 is such that when the light reflective shields 19 are assembled to the main frame, the saddles come in contact or very close adjacent relationship with respect to the bubble vials situated in the slots 30.

To assemble the prior art unlighted level 10, with the vials 14 positioned in their confining slots 30,30, the light reflective shields 19 are positioned so that their skirts 36 come in contact with each other through the main frame sight openings, the opaque panels 18 are forced into position between the flanges 37,37 of the outer bars 25,25 so that each of the fastening bosses 38 is trapped beneath its adjacent flange 37. Fastening screws 39,39 are then introduced through the screw holes and threaded into the tapped screw holes of the second side plate 17.

To retrofit the prior art unlighted level 10 to form the retrofitted illuminated level 20, the fastening screws 39,39 are removed, the opaque side panel 18 of the first side plate 16 is pried outwardly to bring its four fastening bosses 38 into clearing relation with respect to the flanges 37,37, the first side plate 16 is removed, and is replaced with a retrofit assembly 45.

This retrofit assembly 45 includes a retrofit side plate 46 made up of a retrofit opaque side panel 48 and a retrofit light reflective shield 49.

The retrofit opaque side panel 48, in the form of the invention as shown, is identical with the opaque side panel 18 except that a switch button 52 of a switch 54 is mounted to extend through one end of the panel 48 in position where it can be accessed by a user of the retrofitted illuminated level 20; and except that it has been hollowed out to receive a circular battery 56 and other elements of the switch 54.

The retrofit light reflective shield 49 can be identical with the light reflective shield 19, and serves the same useful purposes as that shield. However, like the light reflective shield 19, it can be made of white thermo plastic material, and a plurality of light emitting diodes (LED) 58 are positioned between an outer shell of the shield and the web 26 of the I-shape frame member 22 of main frame 12. In the light reflective shields 19 and 49, in addition to the skirts 36 extending from the face or shell of those shields toward the frame web 26, there are also upstanding strengthening and positioning walls indicated generally at 60. As best seen in FIGS. 3 and 4, pairs of these LED's are situated at end portions of each of the bubble vials 14. Electrical conductors 59 are provided connecting each LED to the switch on one side and to a first side of the battery on the other. The switch is connected to the second side of the battery to complete the circuit.

When the switch button 52 is depressed, a circuit is made through the switch from each side of the battery and across each LED, thus energizing the LED.

In the form of the invention as shown, a pair of rigid wires extend from each of the LED's, and these wires are extended through the walls 60 as needed to hold the LED's in permanent position in spite of any shock such as dropping which may occur. In other forms of the invention, the LED's can be supported in other ways to insure that they do not move from their positions.

FIG. 4 is a bottom plan view of the retrofit assembly 45 showing the relative positioning of the LED's with respect to the various parts of the opaque retrofit side panel 48 (having the same elements as the opaque side panel 18) and the retrofit light reflective shield 49 (having the same elements as the light reflective shield 19). To relate these LED's to the vials as they will be related when the retrofitted illuminated level 20 is completely assembled, FIG. 3 shows these vials 14 firmly and permanently situated in confining slots 30,30 of the web 26 of the frame 12, and shows the relative positioning of the LED's 58 with respect to each of those vials with the schematic representation of two electrical conductors 59 extending from each of those LED's.

The retrofitted illuminated level is assembled after the first side plate is removed by forcing the retrofit side plate 46 made up of the retrofit opaque side panel 48 and the retrofit light reflective shield 49 down into the space formerly occupied by the first side plate 16 with the four fastening bosses 38 of the panel 48 taking position between the flanges 37,37 of the outer bars 25,25 of the main frame so that each of the fastening bosses 38 is trapped below its adjacent flange. Fastening screws 39,39 are then again installed and the retrofit is complete.

It is to be noted that each pair of LED's is situated to throw light on an end portion of one of the vials 14. When the switch 54 is closed by depressing switch button 52, light from the LED's flows into the transparent plastic cylinder making up each vial, and flows through the liquid in the vial until it hits the reflective surface of the air bubble to very clearly outline the positioning of the air bubble in the vial even in areas of total darkness.

In using the illuminated level 20, an electrician working on new construction, for example, will make good use of the magnetic panel 27 of one of the main frame outer bars 25. To properly position a metallic electrical conduit, junction box or other magnetically attractable component before nailing it down, the main frame working surface 24 which includes the magnetic strip 27 will be placed against such component where it will "stick" by magnetic attraction. The electrician will move the component to achieve the proper horizontal, vertical or other desired alignment of the component using the bubble position in one of the level vials as a guide. When the proper positioning has been achieved, the component will be nailed or otherwise fastened in place. During this process, it is inevitable that enough jarring of the component or level will often take place so that the magnetic attraction will be broken and the level will fall to the ground or floor. This usage makes it imperative that an illuminated level be droppable without breakage of the light emitting source.

Although the present invention has been described with reference to preferred embodiments, workers skilled in the art will recognize that changes may be made in form and detail without departing from the spirit and scope of the invention.

What is claimed is:

1. A retrofit assembly for converting an unlighted level to an illuminated level, the unlighted level including:

an elongate main frame provided with two parallel, spaced-apart longitudinally extending flat, plane working surfaces and a web extending between said working surfaces generally in parallel relation to the longitudinal axes of the working surfaces and at right angles to the plane of the working surfaces, said web being provided with a plurality of frame sight ports therethrough;

a plurality of bubble vials each positioned in the main frame across and slightly beyond one of the frame sight ports to have a permanent fixed angular relationship with respect to the plane of the main frame working surfaces, and first and second side plates positioned in parallel relation to each other to cover at least a substantial portion of the main frame web, with one of said side plates being positioned on each side of the main frame, said side plates each being provided with a plurality of side plate sight ports in visual alignment with each of the main frame sight ports, and fastening means to removably position the first side plate to the main frame;

said retrofit assembly including:
(a) a retrofit side plate of configuration and character to effectively replace said first side plate when said first side plate has been removed, said retrofit side plate having a plurality of side plate sight ports therethrough positioned to be in visual alignment with the main frame sight ports;
(b) a plurality of light emitting diodes each mounted on a side of the retrofit side plate adjacent the main frame web to have position to emit light on end portions of said bubble vials, each such diode being in spaced, adjacent relation to and outside of a bubble vial;
(c) a switch mounted to the retrofit side plate in position to be activated by an operator;
(d) battery means mounted to a side of the retrofit side plate adjacent the web; and
(e) electrical conductors mounted to a side of the retrofit side plate adjacent the web, said conductors coupling the light emitting diodes, the battery means and the switch to cause energization of the light emitting diodes when the switch is actuated.

2. The retrofit assembly of claim 1 wherein:
(f) the retrofit side plate includes an outer opaque side panel having panel sight ports visually aligned with each of the main frame sight ports, and includes an inner light reflective shield having shield sight ports visually aligned with each of said main frame sight ports and panel sight ports;
(g) said inner reflective shield is provided with an outer shell in adjacent relation to an inner surface of the outer opaque side panel and in spaced, generally parallel relation to said main frame web, said inner light reflective shield being provided with a light reflective skirt around each shield sight port, said skirts extending generally from the shell to said web, each skirt being provided with a pair of saddles situated to encompass outer end portions of its adjacent vial;
(h) said shield skirt saddles and vials are of size and configuration and are in position such that end portions of each vial extend into and through said saddles; and
(i) said light emitting diodes are each positioned between said first light reflective shield shell and the web, there being a light emitting diode positioned immediately adjacent each end portion of each bubble vial on a side of the skirt saddle outside of the shield sight port.

3. The retrofit assembly of claim 2 wherein:
(j) the switch is mounted in the retrofit side plate to extend through the outer opaque retrofit side panel;
(k) the battery is mounted to the outer opaque retrofit side panel; and
(l) the electrical conductors and diodes are mounted to the inner retrofit light reflective shield with electrical connections extending to the switch and the battery in the retrofit side panel.

4. The retrofit assembly of claim 1 wherein:
(f) said light emitting diode means includes a light emitting diode situated at each end of at least one bubble vial so that light is emitted on each end portion of such at least one bubble vial.

* * * * *